(No Model.)

T. MILLER.
CAR BRAKE AND STARTER.

No. 359,880. Patented Mar. 22, 1887.

WITNESSES:

INVENTOR
Thos. Miller
BY
A. P. Thayer
ATTORNEY

UNITED STATES PATENT OFFICE.

THOMAS MILLER, OF JERSEY CITY, NEW JERSEY.

CAR BRAKE AND STARTER.

SPECIFICATION forming part of Letters Patent No. 359,880, dated March 22, 1887.

Application filed September 30, 1886. Serial No. 214,944. (No model.)

*To all whom it may concern:*

Be it known that I, THOMAS MILLER, of Jersey City, Hudson county, New Jersey, have invented a new and useful Improvement in Brakes and Starters for Cars and other Wheel-Vehicles, of which the following is a specification.

My invention consists of an improved contrivance of springs for automatically setting on the brakes when the draft ceases and for relieving the shocks of starting, together with a lever contrivance enabling the driver to control the action of the springs alike, whether subject to the draft or not, the device being more particularly designed for horse-cars, but is useful also for trucks and other wheel-vehicles, all as hereinafter fully described, reference being made to the accompanying drawings, in which—

Figure 1:
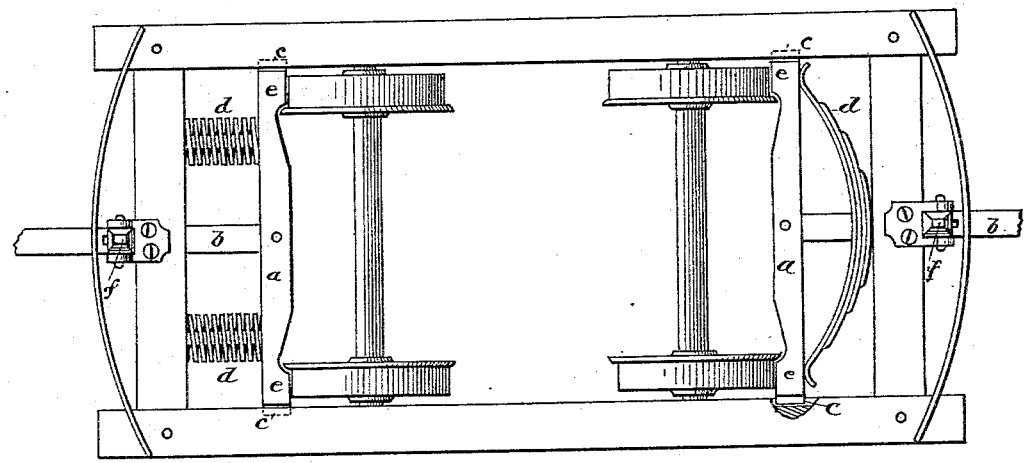
Figure 2:
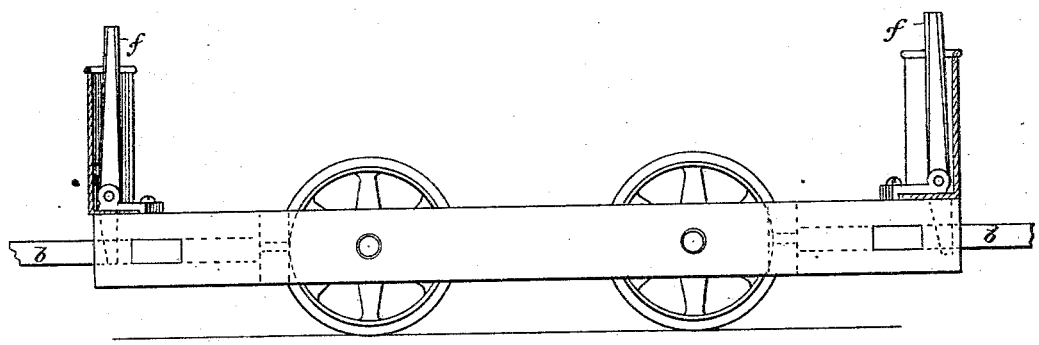

Figure 1 is a plan view of the bed-frame and running-gear of a street-car with my improved brake and starter applied. Fig. 2 is a side elevation of the same.

I arrange a brake-beam, $a$, in front of one or both pairs of the wheels of a car or truck, preferring to use an independent beam for each end of a street-car that is not to be reversed at the ends of the route, connecting said beam to the draft-bar $b$, by which the car is drawn, and fixing it in slide-ways $c$, allowing it to slide to and from the wheels, with elliptic, coiled, rubber, or other approved springs, $d$, adjusted to force the brakes $e$ back on the wheels when the draft ceases, and also with a lever, $f$, pivoted on the bed-frame and connected by its short arm with the draft-bar, while the long arm extends upward conveniently for use by the driver to enable him to control the brake, as for preventing contact with the wheels when the draft ceases, or for continuing the contact or causing the same when the horses continue to pull, which may sometimes be required; but generally the brakes will automatically close on the wheels and properly stop the car in unison with the slowing of the horses and the cessation of the draft, and the pull for the starting of the car will automatically release the brakes.

The lever will serve to put on the brakes in times when the team does not respond promptly to the signal for stopping, and when it may be required to relieve the brakes independently of the draft. The springs also facilitate the starting of the car in this arrangement by relieving the horses of the shocks to which they are subject in the common unyielding hitching attachment.

What I claim, and desire to secure by Letters Patent, is—

1. The combination, in a street-car or other wheel-vehicle, of the sliding brake-beam arranged in front of the wheels, and having the brake-shoes for the wheels, the hitching or draft bar attached to said brake-beam, and a spring or springs connecting the beam with the vehicle-body for the application of the draft through the medium of said spring or springs, and for the automatic application of the brakes by the direct action of said spring or springs when relieved of the draft to the wheels, substantially as described.

2. The combination, in a street-car or other wheel-vehicle, of the sliding brake-beam arranged in front of the wheels, the hitching or draft bar attached to said beam, springs connecting the beam with the vehicle-body for the application of the draft and for the automatic application of the brake, and the brake-lever for the control of the brake independently of the draft, substantially as described.

THOMAS MILLER.

Witnesses:
W. J. MORGAN,
S. H. MORGAN.